US011135507B2

(12) United States Patent
Connor et al.

(10) Patent No.: US 11,135,507 B2
(45) Date of Patent: Oct. 5, 2021

(54) HEAD-MOUNTABLE APPARATUS AND SYSTEMS (71) Applicant: Sony Interactive Entertainment Inc., Tokyo (JP)

(72) Inventors: Patrick John Connor, London (GB); Simon Mark Benson, London (GB)

(73) Assignee: Sony Interactive Entertainment Inc.

( * ) Notice: Subject to any disclaimer, the term of this patent is extended or adjusted under 35 U.S.C. 154(b) by 118 days.

(21) Appl. No.: 16/482,506

(22) PCT Filed: Jan. 15, 2018

(86) PCT No.: PCT/GB2018/050096
§ 371 (c)(1),
(2) Date: Jul. 31, 2019

(87) PCT Pub. No.: WO2018/142100
PCT Pub. Date: Aug. 9, 2018

(65) Prior Publication Data
US 2020/0246693 A1 Aug. 6, 2020

(30) Foreign Application Priority Data

Feb. 2, 2017 (GB) ...................................... 1701734

(51) Int. Cl.
*A63F 13/28* (2014.01)
*A63F 13/52* (2014.01)
*G06F 1/16* (2006.01)
*G06F 3/14* (2006.01)

(52) U.S. Cl.
CPC .............. *A63F 13/28* (2014.09); *A63F 13/52* (2014.09); *G06F 1/163* (2013.01); *G06F 3/14* (2013.01); *A63F 2300/302* (2013.01); *A63F 2300/8082* (2013.01)

(58) Field of Classification Search
USPC .............................................. 463/31; 345/474
See application file for complete search history.

(56) References Cited

U.S. PATENT DOCUMENTS 6,073,458 A    6/2000  Kim
6,409,338 B1   6/2002  Jewell
(Continued)

FOREIGN PATENT DOCUMENTS

CN    204666956 U    9/2015
CN    205164154 U    4/2016
WO    2010070534 A1  6/2010

OTHER PUBLICATIONS

S. Cardin et al.: "Head Mounted Wind," Proceeding of the 20th annual conference on Computer Animation and Social Agents (CASA 2007), May 15, 2007, pp. 101-108.
(Continued)

*Primary Examiner* — Pierre E Elisca
(74) *Attorney, Agent, or Firm* — Lerner, David, Littenberg, Krumholz & Mentlik, LLP (57) ABSTRACT

A head-mountable display (HMD) for use with a processing device, the HMD comprising a display unit for displaying image content to the user, and a directional airflow unit operable to generate a directional airflow in accordance with control data corresponding to an appropriate airflow for content to be displayed on the HMD.

15 Claims, 5 Drawing Sheets

(56) References Cited

U.S. PATENT DOCUMENTS

| | | | | |
|---|---|---|---|---|
| 2014/0197937 A1* | 7/2014 | Huang | ............... | A61H 9/0071 |
| | | | | 340/407.1 |
| 2016/0041391 A1* | 2/2016 | Van Curen | ........... | G02B 27/017 |
| | | | | 345/633 |
| 2016/0274662 A1* | 9/2016 | Rimon | ................... | G06F 3/016 |

OTHER PUBLICATIONS

N. Ranasinghe et al.: "AmbioTherm", User Interface Software and Technology, ACM, Oct. 16, 2016, pp. 85-86.
S. D. Kulkarni, et al.: "A Full Body Steerable Wind Display for a Locomotion Interface," IEEE Transactions on Visualization and Computer Graphics, vol. 21, No. 10, Oct. 31, 2015, pp. 1146-1159.
International Search Report for International Application No. PCT/GB2018/050096, filed on Jan. 15, 2018.
Combined Search and Examination Report, dated Jun. 21, 2017.
S.M. LaValle, "Virtual Reading," Dec. 31, 2016, p. 348.
Examination Report for Application No. GB 1701734.4 dated Sep. 6, 2019, pp. 1-4.

* cited by examiner

HEAD-MOUNTABLE APPARATUS AND SYSTEMS

CROSS REFERENCE TO RELATED APPLICATIONS

The present application is a national phase entry under 35 U.S.C. § 371 of International Application No. PCT/GB2018/050096, filed Jan. 15, 2018, published in English, which claims the benefit of and priority to GB Patent Application No. 1701734.4, filed Feb. 2, 2017, the entire disclosures of which are hereby incorporated herein by reference.

This invention relates to head-mountable apparatus and systems.

A head-mountable display (HMD) is one example of a head-mountable apparatus. Audio headphones comprising a frame supporting one or more audio transducers are another example of a head-mountable apparatus. A head-mounted torch or light is a further example of a head-mountable apparatus. The following background discussions will relate mainly to HMDs, but the principles are also applicable to other types of head-mountable apparatus.

In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

Various aspects and features of the present invention are defined in the appended claims and within the text of the accompanying description and include at least a head-mountable apparatus such as a display and a method of operating a head-mountable apparatus as well as a computer program.

Embodiments of the invention will now be described, by way of example only, with reference to the accompanying drawings, in which.

Figure 1:
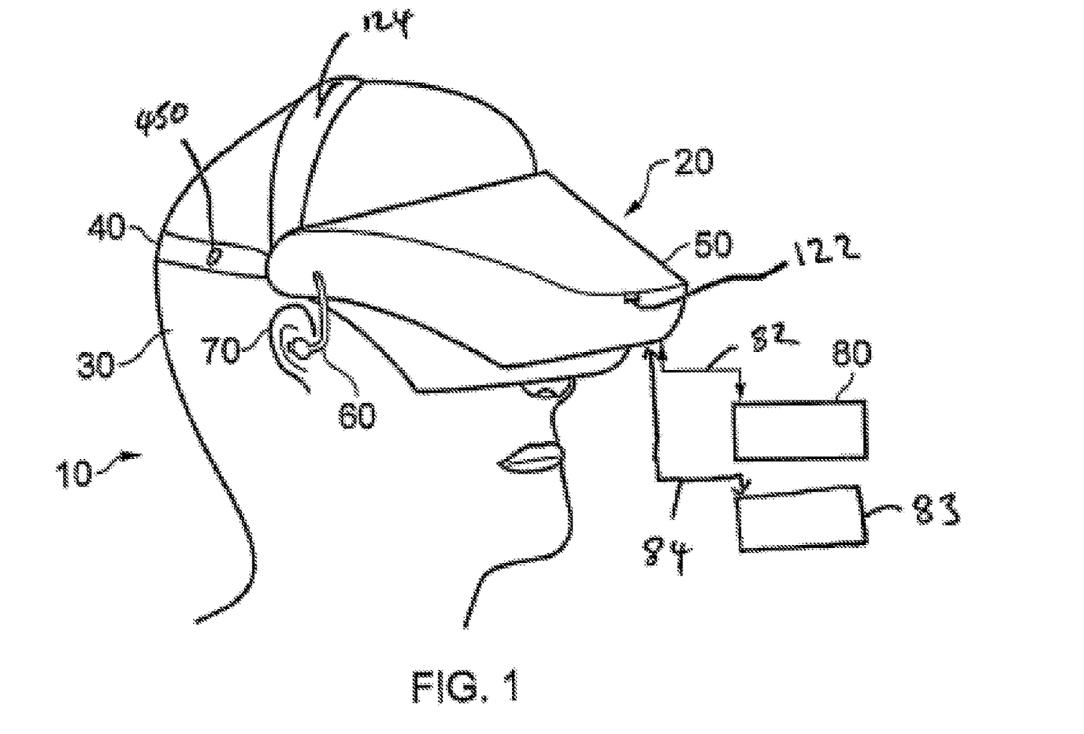
FIG. 1 schematically illustrates an HMD worn by a user.

Referring now to FIG. 1, a user 10 is wearing an HMD 20 (as an example of a generic head-mountable apparatus—other examples, where the technical context allows, including audio headphones or a head-mountable light source) on the user's head 30. The HMD comprises a frame 40, in this example formed of a rear strap and a top strap, and a display portion 50.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160.

Figure 2:
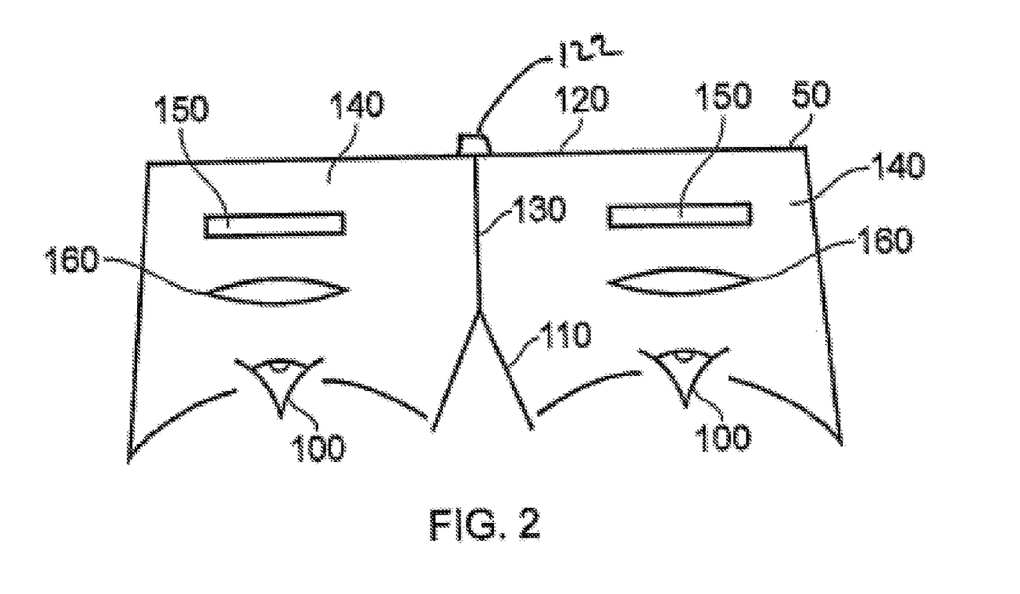
FIG. 2 is a schematic plan view of an HMD.
Figure 3:
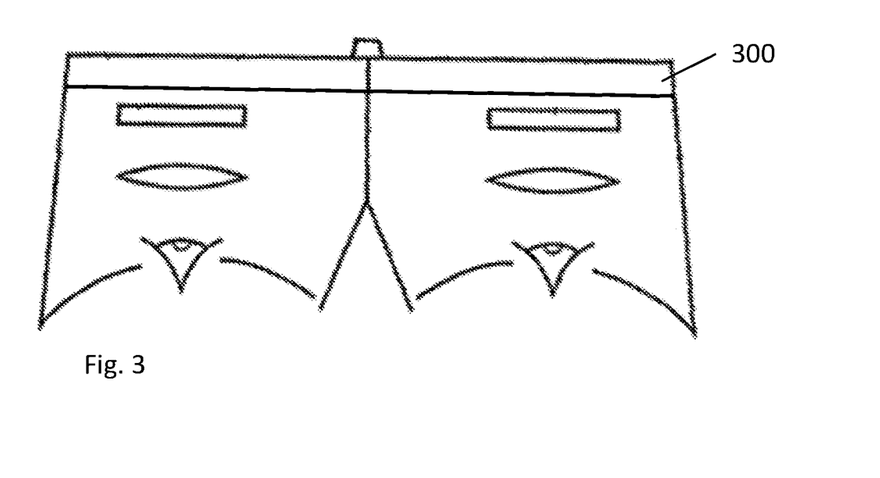
FIG. 3 is a schematic plan view of an HMD comprising a directional airflow unit.

FIG. 3 shows a modified version of the HMD of FIG. 2, differing in that the HMD includes a directional airflow unit 300 (the features of which are discussed below with reference to FIG. 4). The location of the directional airflow unit 300 in this Figure is entirely exemplary, as it could be arranged anywhere within the HMD so long as it is operable to provide directional airflow that is detectable by a user of the HMD. As is discussed in further detail below, the directional airflow unit is operable to generate a directional airflow in accordance with control data corresponding to an appropriate airflow for content to be displayed on the HMD.

The generation of a directional airflow for an HMD may be advantageous for a number of reasons. For example, one cause of a loss of immersion when playing a VR game may be that no matter what the environment, there is no airflow around the user's face due to the presence of the HMD. An extreme example of this would be when playing a game in which there was a hurricane; the user may not feel particularly immersed in such an environment when the air is completely still in their real-world environment.

It should be noted that while the directional airflow unit 300 is shown as a flat unit, it may be advantageous to provide a curved unit so as to more closely mimic the curvature of the user's head. This may be useful in ensuring an even distribution of the airflow, as well as simplifying the modeling used to determine which elements of the directional airflow unit 300 must be operated in order to provide the desired effect on the user's face.

Much of the following description is made with reference to fans being used to generate airflow in the directional airflow unit 300; however it should be understood that any suitable equipment for generating an airflow could be used. For example, air pumps could be used in place of fans. Micro pumps may be of particular usefulness, in consideration of the size and weight restrictions that result from the use of the directional airflow unit 300 being in an HMD.

Similarly, many embodiments are described with reference to an in-game state or the like; it should be noted that any content being executed by the processing device may cause operation of the directional airflow unit 300. For example, video content could be supplied with metadata that can be used to determine an appropriate airflow and corresponding control data for the directional airflow unit 300. Alternatively, or in addition, an appropriate airflow could be derived from an analysis of the video content to identify indicators of airflow in the environment. An example of such an indicator is that of a swaying tree, a motion which is usually caused by wind. This could also be extended to still images, the viewing of which may be enhanced for the user by generating an appropriate airflow.

Figure 4:
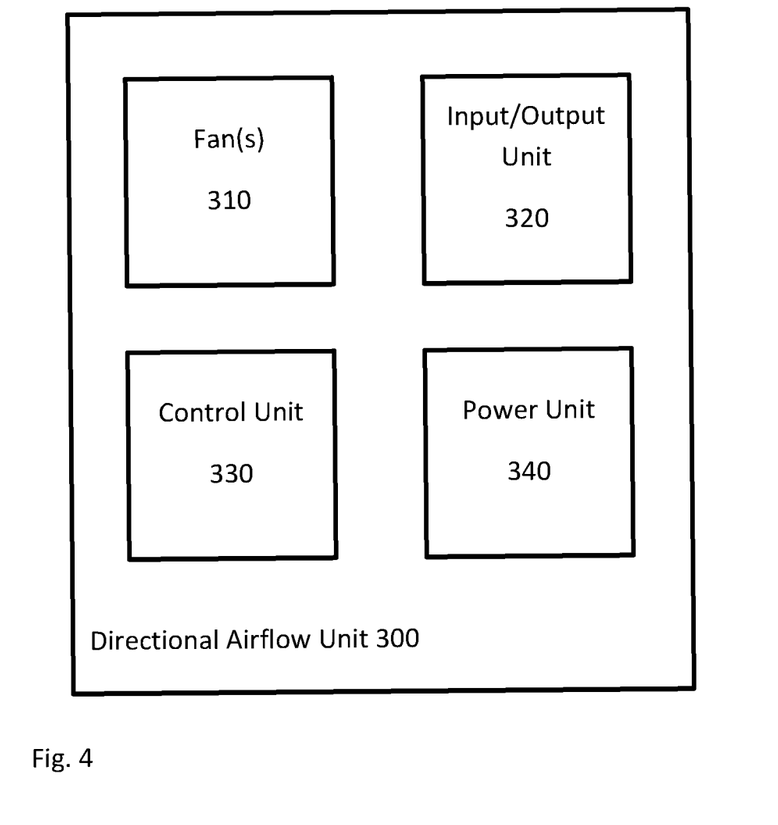
FIG. 4 schematically illustrates a directional airflow unit.

FIG. 4 schematically illustrates a directional airflow unit 300. The directional airflow unit 300 comprises fan(s) 310, an input/output unit 320, a control unit 330 and a power unit 340.

The fans 310 are an arrangement of one or more fans within the HMD 20. A selection of suitable arrangements will be discussed below. Associated with the fans 310 may be one or more vents 315 (see FIG. 5) that are operable to restrict or allow airflow where desired.

The input/output unit 320 is operable to receive operation instructions from an associated processing device and/or game state information that allows the control unit 330 to control the fans 310 (and/or vents 315) accordingly. The input/output unit 320 may also be operable to output information to the associated processing device; for example, local or HMD temperature information, or fan operation information (such as speed or utilisation data).

The control unit 330 is operable to control the operation of the fans 310. The control unit 330 may receive instructions from the associated processing device via the input/output unit 320 and modify the fan operation accordingly. Alternatively, or in addition, the control unit 330 may receive information about a game state and perform processing in order to determine what an appropriate operation of the fans 310 would be. While the former example would reduce the processing burden on the directional airflow unit 300, the latter may allow a greater degree of compatibility with other content or processing devices.

The power unit 340 may comprise a battery, a connection to an external power source (or that of the HMD), or any other appropriate source of power.

The directional airflow unit 300 may be provided as a peripheral for the HMD 20, such as a clip-on fitting to be added to the front of the HMD 20 or to an internal (face-side) surface, or it may be built into the HMD 20 as a standard feature. Alternatively, a combination of the two may be provided; a basic directional airflow unit 300 may be provided in the HMD 20 that may be upgraded or supplemented with additional fans or other features.

Figure 5:
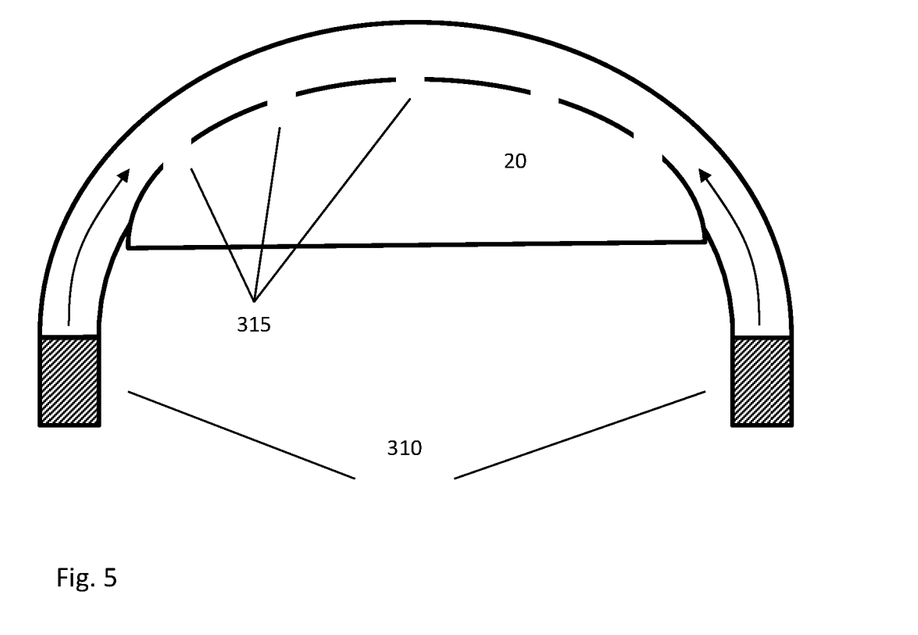
FIG. 5 schematically illustrates a fan arrangement for an HMD.

FIG. 5 schematically illustrates an HMD 20 that has a directional airflow unit 300 that comprises a pair of fans 310 arranged at opposite ends of the directional airflow unit 300 (located near the user's ears, in this example, although other locations may also be suitable such as at the front of the headset). The directional airflow unit 300 is also provided with a plurality of closable vents 315 positioned so as to modify the directional airflow generated by the fans 310. Channels, ducts or piping (more generally, air conduits) may transfer air from the fans to the functional or central part of the directional airflow unit, for example if the fans are placed at a distance from the face side of the HMD (for example, as part of a rear body of the HMD). The use of such air conduits may also enable the use of a single fan supplying both left and right conduits.

Such an embodiment allows for a high degree of control over the airflow, such that the speed and direction of the airflow may be manipulated to provide the desired effect.

Each fan 310 may be operated independently at a selected speed; therefore airflow may be provided from the left or right at a desired speed. The fans 310 may also act in a complementary manner, such that when one is caused to push air towards the vents 315, the other is caused to suck air away from the vents 315.

A fan 310 may be operated at a selected speed using any suitable method, where an increased operation speed of a fan provides a greater and/or faster airflow. For example, a fan 310 may simply have a plurality of selectable speeds which may be selected as appropriate by the control unit 330, Alternatively, or in addition, the operation of the fan 310 may be controlled by voltage regulation of the power supplied to the fan; an increased voltage may be provided to the fan 310 so as to cause the fan speed to be increased, while a lower voltage may cause a decrease in the fan speed.

As a further, or another alternative, method of control, the power input to the fan 310 could be pulsed so as to switch between an on and off (or high-power and low-power) state at a particular frequency. This has the effect of causing the fan 310 to operate at a speed lower than the maximum possible speed as there is a regular slowing of the fan 310 due to the low-power state being used. The operation speed may be selected using this method by controlling the timing of the pulses or changing the power levels between which the switching is performed.

As an example of varying the timing, the high-/low-power signals could have operating durations of different ratios, such that a 70:30 duration ratio provides a higher operation speed than a 30:70 duration ratio. To demonstrate the changing of the power levels being used to vary the operation speed, it is noted that alternating between 100% power and 0% power produces a lower fan speed than alternating between 100% power and 50% power.

The vents 315 may be operated to prevent or allow airflow by opening or closing the vents to the passage of air. The vents 315 may be operated individually, for example acting as independent units, or operated in groups. An example of a suitable grouping is the use of the groups 'left-side vents', 'central vents' and 'right-side vents' which may each comprise one or more of the vents 315.

The opening/closing of the vents 315 may be partial, so as to restrict rather prevent airflow. In some embodiments, variable valves or the like may be provided that can be opened/closed to a specified degree. This could allow airflow to be 'focused' towards a particular position to as to provide a number of different effects to the user. For example, a first and second vent may be open, a third half open, a fourth quarter open and a fifth fully closed.

The individual vents may thus change the air flow volume, speed and/or exit direction depending on the specific vent design. Examples of suitable vent arrangements include valves, shutters, or retractable flaps.

In some embodiments, the vents 315 may be operated sequentially—for example as a 'wave' from left to right to simulate the airflow expected from a passing vehicle. The speed of this wave may be varied in dependence upon the speed of a virtual vehicle (or the like) that the user is experiencing, such that a slower-moving vehicle causes the vents to open and close more slowly.

Figure 6:
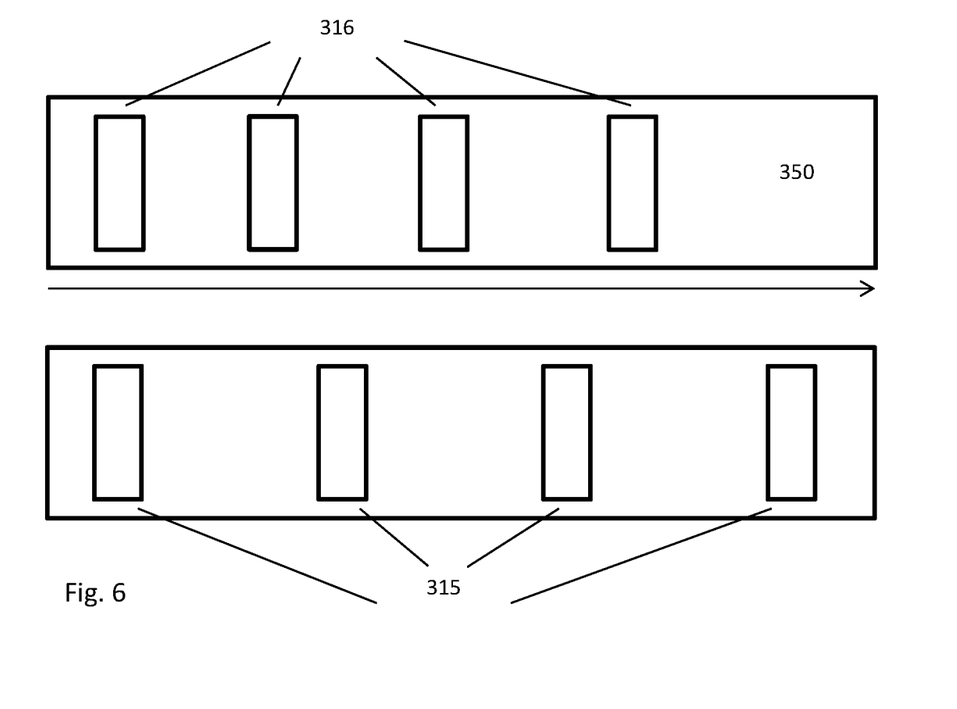
FIG. 6 schematically illustrates an adjustable vent arrangement.

FIG. 6 schematically illustrates an alternative means for controlling the vents 315 of FIG. 5.

Operating each vent 315 independently may result in a complex system as the number of vents 315 increases. As an alternative, a blanking plate 350 comprising a plurality of slots 316 may be provided for closing one or more of the vents 315. In operation, blanking plate 350 sits in front of, or behind, the portion of the directional airflow unit 300 that comprises the vents 315. The slots 316 are arranged so as to only ever allow a maximum of one vent 315 to be open at a time; the rest of the vents 315 will be closed to airflow by the non-slot portions of the blanking plate 350. The arrangement of slots 316 and vents 315 may be designed such that a maximum translation of a size equivalent to the vent 315 spacing is all that is required in order to allow any of the vents 315 to be 'selected' for use by the blanking plate 350.

For example, if the vent 315 spacing (measured from the centre of a first vent to the centre of the adjacent vent) in FIG. 6 were taken to be 1 cm and the spacing of the slots were taken to be 0.75 cm, then:

No translation results in a selection of the first vent 315, as illustrated;
A translation of 0.25 cm results in the selection of the second vent 315;
A translation of 0.5 cm results in the selection of the third vent 315; and
A translation of 0.75 cm results in the selection of the fourth vent 315.

Of course, the respective widths and spacings of the vents 315 and slots 316 will be selected appropriately for the number of each that are present, so as to ensure only the desired number of vents 315 and slots 316 overlap at any given time.

An advantage associated with such an arrangement is that a simple mechanical operation is provided which requires only a small amount of movement; therefore the burden placed on the design of the HMD itself is reduced as a simple and suitably compact directional airflow unit 300 may be provided.

While the discussion of FIG. 6 has been with respect to a single vent 315 being used at a single time, it would be apparent that the relative arrangements of slots 316 and vents 315 could be selected so as to allow any pattern of one or more vents to be open at a single time.

It is also envisioned that a number of different blanking plates could be provided with the directional airflow unit 300, thereby allowing the combinations of open and closed vents 315 to be modified in a simple manner.

Figure 7:
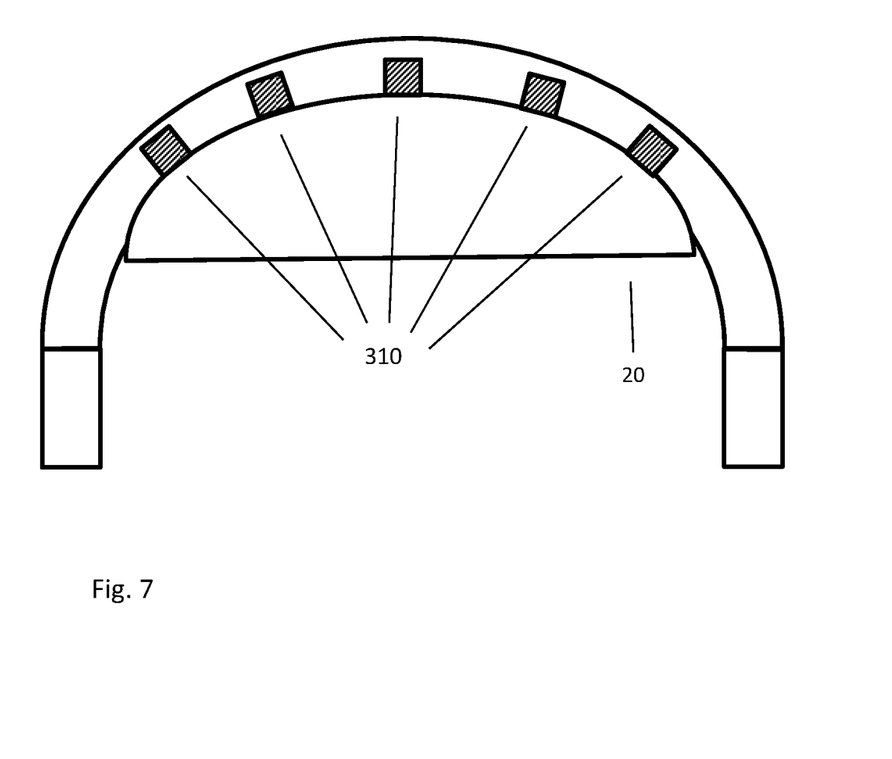
FIG. 7 schematically illustrates a further fan arrangement for an HMD.

FIG. 7 schematically illustrates an arrangement of multiple fans 310 that are operable to provide a direct airflow towards a user's face. This may be achieved by providing a plurality of fans 310 that are distributed around the periphery of the HMD 20 that are operable to generate a flow of air towards the user's face. The fans 310 can of course be located anywhere on the HMD 20; for example, above or below a display, rather than being limited to being provided on the periphery of the HMD 20.

As noted in the discussion of FIG. 5, the fans 310 may be operated independently to produce a directional airflow, or in any suitable combination and operation mode. In some embodiments the fans 310 may be manoeuvrable, meaning that the fans 310 are controllable so as to modify their position and/or orientation in response to received instructions. The fans may also be controllable to alter their speed and hence the speed/amount of airflow.

For example, the fans 310 may each be mounted on a track that extends around the directional airflow unit 300 and provided with a means for generating motion. An example of such means is a motor that causes wheels attached to a fan 310 to move, the motion of the wheels causing the fan 310 to be propelled along the track with a velocity according to the received motion instructions. The fans 310 could be controlled individually, so as to increase the number of possible directions an airflow could be generated from, or the fans 310 could be controlled in groups so as to generate different effects (for example, simulating a passing vehicle). Such an arrangement may be advantageous in that a continuous, moving airflow may be considered to be more immersive than a switch between two different airflow sources.

Alternatively, or in addition, a track that extends vertically may be provided to enable vertical translational motion of the fans 310. By providing such tracks, one- or two-dimensional motion could be provided for any suitable direction with respect to the HMD 20, and not just horizontal/vertical motion. By using curved tracks, this could be extended to three-dimensional motion.

Each of the fans 310 (or a selection of the fans 310) may also be provided with one or more actuators that are operable to vary the orientation of the fan 310. For example, a fan 310 could be provided with a linear actuator on each corner and the actuators could be operated in pairs to provide at least an upwards, downwards, leftwards and/or rightwards tilt. As with the motion of the fans 310, the fans 310 may be operated on an individual basis or in groups.

While each of the fans 310 is illustrated as being identical in FIG. 7, it may in fact be advantageous to provide fans 310 of different sizes. An example of this is in providing large fans to the far left and right of a user's head, but providing a greater number of smaller fans in more central regions. This allows for a more precise airflow to be generated in a central area, which is where a user is likely to be more sensitive to the directionality or strength of an airflow, while allowing fewer fans to be used in the periphery where the user is likely to be less sensitive (or applications of a directional airflow do not require an equivalent amount of control in such areas).

Rather than a series of discrete fans 310 placed around the periphery of the HMD 20, a continuous array could be provided instead. An example of this is a 1×4 arrangement of fans. Of course, it should be appreciated that an array could be provided that is any size—a 2×5 arrangement would provide greater vertical airflow coverage as well as suitable horizontal airflow coverage. Alternatively, the fans could be grouped into discrete sets (such as 3 pairs of fans being provided) as a balance between the number of fans and the amount of airflow that can be generated in a particular direction. An array of fans 310 need not be a simple n×m array, for example such an array could comprise a lower layer of 5 fans and an upper layer of 3 fans; that is to say that not all rows and columns must comprise the same number of fans 310.

The directional airflow unit could also comprise one or more fans arranged as an array with a non-planar profile, for example by arranging them in a curved manner. This may be advantageous in that the shape of the fan array may more closely match the curve of a user's head, and therefore the generation of a suitable directional airflow may be simplified.

A non-planar profile could also be achieved by tilting the fans relative to each other, for example so that some are aimed towards the top of a user's face and some towards the bottom, or so that fans are directed towards the left or right of the user's face. By tilting the fans relative to each other, a greater degree of control over the airflow may be provided, in addition to allowing a greater coverage of the user's face by the airflow.

Again it will be appreciated that in the above description 'fans' may equally mean pumps or micro-pumps such as piezoelectric air pumps.

One use of the directional airflow unit, as described above, is to provide a more immersive VR experience by generating an airflow that more closely resembles that of the virtual environment that the user is experiencing via the displays of the HMD, for example in terms of direction and/or air speed. This may, for example, include simulating wind conditions, passing vehicles or the rush of air as the user runs in the game. In order to generate such a simulation control data may be generated that describes an airflow speed and direction, or any other suitable variables.

It is also possible that temperature or humidity of the airflow may also be varied so as to enhance the effect of generating the airflow. This may provide a further increase in immersion for a user. To provide such a feature, heating and/or cooling elements for controlling the temperature of the directional airflow are provided in the directional airflow unit. For example, a heating element may be provided that is associated with one or more of the fans in the directional airflow unit so as to provide a flow of warm air; similarly, a cooler may be provided in the directional airflow unit instead of or as well as the heating element. In different embodiments, a fan may be associated with both a warm air source and a cold air source, only one of the sources, or neither of the sources.

With regards to controlling the humidity, a water source could be provided so as to generate a mist or otherwise add moisture to the airflow; of course, the optics and electronics may need to be shielded against the airflow in such an embodiment. However, if the optics are exposed to the airflow then the airflow may be used for demisting components of the HMD by controlling the temperature and/or humidity of the airflow.

It is also envisaged that the directional airflow can be used to communicate a scent to a user, if the directional airflow unit or HMD is associated with a suitable scent emitter. By providing scents to a user, the sense of immersion may be increased further yet. Scent emitters could be associated with one or more of the fans, for example, and an airflow may be generated so as to deliver the scent to the user. The use of a directional airflow unit for such a purpose is advantageous for several reasons.

For instance, the amount of a scent that needs to be provided may be reduced as a result of the more efficient delivery of the scent to the user's nose. Additionally, the pump that is often associated with scent emitters may be entirely replaced (or reduced in power), or the noise of operation of the pump may be substantially masked by the operation of the directional airflow unit.

Further to these uses, the directional airflow may be used as a method for providing the user with information relevant to gameplay. For example, the directional airflow may be used as a cue to perform a particular action or to guide a user to a particular location or in-game option. For instance, by using the directional air flow directions may be able to be provided to assist a user in navigating out of a virtual cave in the absence of any visual clues—as in real life, following an air flow to its source is likely to lead to an exit of the cave. The speed of the airflow could also be varied, providing a user with an indication of when they are getting closer to the exit, or by indicating a preferred path.

A further example of providing information relevant to gameplay is in the context of an unseen or unheard companion in a game. It is noted that a particular pattern, speed and direction of airflow could be used to communicate messages or hints to a user from a companion. This can reduce the need for an in-game avatar or voice representing the companion to be provided. An example of such a communication is the use of a Morse code signal, although in an in-game environment it is likely that a more simplified code would be taught to the user.

The application associated with the processing device may determine that an appropriate airflow is one that most closely matches the direction of the ambient airflow user's environment in the real world, and optionally its strength. For example, in a game in which the user does not possess a physical body (such as if the character is a ghost) or in which the environment is entirely neutral with regards to airflow (such as a level taking place in an environment devoid of wind), the airflow that would likely be most immersive for the user would be that which most closely resembles the airflow being experienced by the rest of the user's body. By generating an airflow matching the airflow that the user is experiencing on the rest of their body, a user is less likely to be reminded of the fact that they are wearing an HMD and thus the user's sense of immersion may be increased.

In order to determine the real-world environmental airflow, an airflow detector can be associated with the directional airflow unit, HMD and/or processing device. An example of such a detector is a hot-wire anemometer, which may be small enough for mounting on a directional airflow unit, but any suitable detector may be provided.

Figure 8:
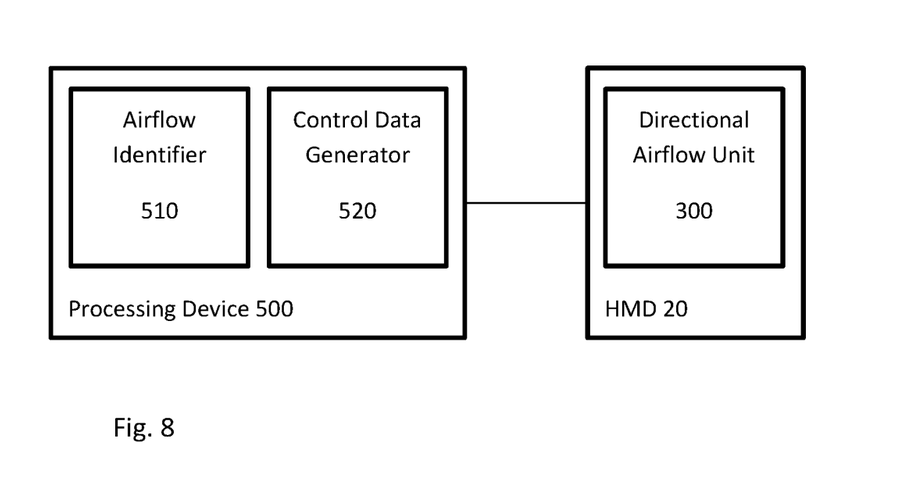
FIG. 8 schematically illustrates a directional airflow generating system.

FIG. 8 schematically illustrates a system for generating a directional airflow. This system comprises a processing device 500 and an HMD 20.

The processing device 500 comprises an airflow identifier 510 for identifying an appropriate airflow for content to be displayed on the HMD, and a control data generator 520 for generating control data corresponding to the appropriate airflow. The HMD 20 comprises a directional airflow unit 300 for generating a directional airflow in accordance with the control data. The processing device 500 and the HMD 20 may be connected by any suitable wired or wireless link in order to transmit the control data.

While the control data generator has been illustrated as being located at the processing device 500, it should be noted that it could instead be located in the HMD 20. For example, the control unit 330 of the directional airflow unit 300 may perform the function of the control data generator. This may be advantageous, as the processing device would not then require knowledge of the functionality of the directional airflow unit 300.

Figure 9:
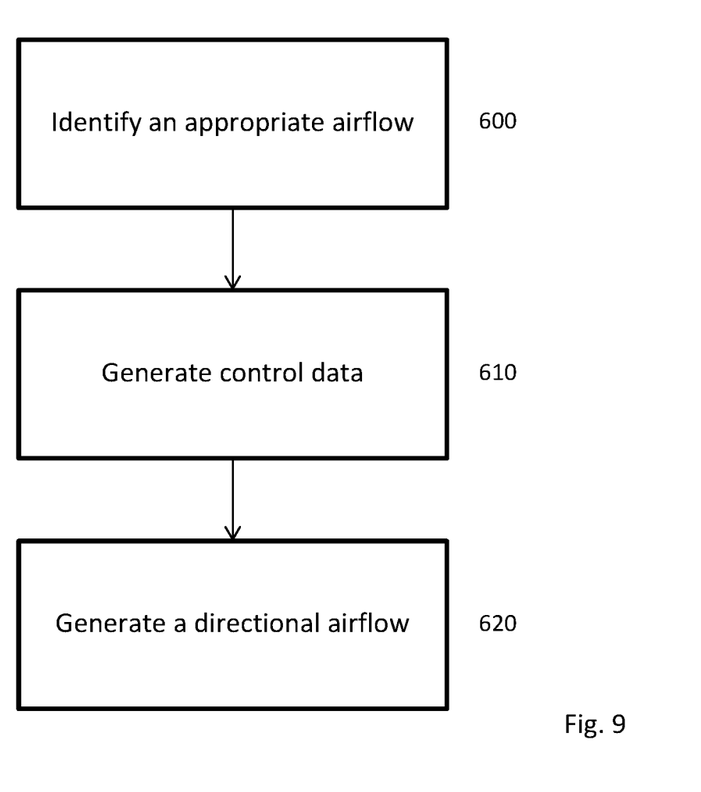
FIG. 9 schematically illustrates a directional airflow generation method.

FIG. 9 schematically illustrates a directional airflow generating method.

A step 600 comprises identifying an appropriate airflow for content to be displayed on the HMD. The appropriate airflow may be described with a direction and/or a speed of airflow. As noted above, an appropriate airflow may be determined based upon in-game conditions of a game being that is executed on the processing device to generate the content to be displayed by the HMD, for example with respect to an in-game environment or the like.

A step 610 comprises generating control data corresponding to the appropriate airflow. This step may consider both the appropriate airflow that is determined in step 600 and the capabilities of the directional airflow unit to be operated using the control data. For example, different control data could be generated for different directional airflow units in dependence upon the respective arrangements of fans.

A step 620 comprises generating a directional airflow in accordance with the control data.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

The invention claimed is:

1. A head-mountable display (HMD) for use with a processing device, the HMD comprising:
    a display unit for displaying image content to the user according to an image signal; and
    a directional airflow unit operable to generate a directional airflow in accordance with control data corresponding to an appropriate airflow for content to be displayed on the HMD.

2. An HMD according to claim 1, wherein the directional airflow unit comprises one or more selected from the list consisting of:
    i. one or more fans that are operated independently to produce a directional airflow; and
    ii. two or more fans and the fans are of at least two different sizes.

3. An HMD according to claim 2, wherein one or more fans are arranged as an array having a non-planar profile.

4. An HMD according to claim 2, wherein the directional airflow unit comprises one or more closable vents positioned so as to modify the directional airflow generated by the fans.

5. An HMD according to claim 4, wherein the directional airflow unit comprises a blanking plate for closing one or more of the vents, the blanking plate comprising one or more slots.

6. An HMD according to claim 4, wherein the directional airflow unit comprises one or more fans connected to the central part of the directional airflow unit by air conduits.

7. An HMD according to claim 1, wherein an appropriate airflow is described by a direction and/or a speed of airflow.

8. An HMD according to claim 1, wherein an appropriate airflow is determined based upon in-game conditions of a game that is executed on the processing device to generate the content to be displayed by the HMD.

9. An HMD according to claim 8, wherein the directional airflow is used to guide a user to a location in the in-game environment.

10. An HMD according to claim 1 wherein the directional airflow is selected to match a direction of ambient airflow in the real-world environment.

11. An HMD according to claim 1, comprising heating and/or cooling elements for controlling the temperature of the directional airflow.

12. An HMD according to claim 1, wherein the directional airflow is used to communicate a scent to a user.

13. A system for providing directional airflow with a head-mountable display device (HMD), the system comprising:
    a processing device comprising:
        an airflow identifier for identifying an appropriate airflow for content to be displayed on the HMD, and
        a control data generator for generating control data corresponding to the appropriate airflow; and
    an HMD according to claim 1 for generating a directional airflow in accordance with the control data.

14. A method for controlling airflow within a head-mountable display (HMD) that is for use with a processing device and includes a display for displaying image content to a user according to an image signal, the method comprising:
    identifying an appropriate airflow for content to be displayed on the HMD;
    generating control data corresponding to the appropriate airflow; and
    generating a directional airflow in accordance with the control data.

15. A computer program which, when executed by a computer, causes the computer to perform the method of claim 14.

* * * * *